US011015585B2

(12) United States Patent
Rosinski

(10) Patent No.: US 11,015,585 B2
(45) Date of Patent: *May 25, 2021

(54) SUBMERSIBLE PUMP ASSEMBLY

(71) Applicant: GHSP, Inc., Grand Haven, MI (US)

(72) Inventor: Ryan David Rosinski, Whitehall, MI (US)

(73) Assignee: GHSP, Inc., Grand Haven, MI (US)

(*) Notice: Subject to any disclaimer, the term of this patent is extended or adjusted under 35 U.S.C. 154(b) by 222 days.

This patent is subject to a terminal disclaimer.

(21) Appl. No.: 15/935,083

(22) Filed: Mar. 26, 2018

(65) Prior Publication Data

US 2018/0209406 A1 Jul. 26, 2018

Related U.S. Application Data

(63) Continuation-in-part of application No. 14/696,811, filed on Apr. 27, 2015, now Pat. No. 10,087,927.

(Continued)

(51) Int. Cl.
*F04B 17/03* (2006.01)
*F04C 2/10* (2006.01)
(Continued)

(52) U.S. Cl.
CPC ............ *F04B 17/03* (2013.01); *F04B 23/021* (2013.01); *F04C 2/10* (2013.01); *F04C 2/102* (2013.01);
(Continued)

(58) Field of Classification Search
CPC .......... F04B 17/03; F04B 23/021; F04C 2/10; F04C 2/102; F04C 2240/30;
(Continued)

(56) References Cited

U.S. PATENT DOCUMENTS 2,700,343 A 1/1955 Pezzillo, Jr.
3,083,893 A 4/1963 Dean
(Continued)

FOREIGN PATENT DOCUMENTS

RU 2027031 C1 1/1995
RU 2122653 C1 11/1998
(Continued)

OTHER PUBLICATIONS

International Search Report and Written Opinion of the International Searching Authority dated May 8, 2013 (International Application No. PCT/US2013/022058).
(Continued)

*Primary Examiner* — Patrick Hamo
*Assistant Examiner* — Joseph S. Herrmann
(74) *Attorney, Agent, or Firm* — Price Heneveld LLP

(57) ABSTRACT

A pump assembly includes an electric motor and different selectable pump covers, and is suitable for mounting within a transmission fluid reservoir for transferring automatic transmission fluid. The pump assembly includes a stator housing having a cylindrical cavity for receiving ATF contained in the transmission fluid reservoir. A rotor is rotatably coupled within the cylindrical cavity and has a plurality of magnets arranged about a rotational axis thereof. A flux collector is coupled with the stator housing adjacent to the cylindrical cavity for transferring magnetic flux from one of the plurality of magnets from a first portion to a second portion thereof. A hall sensor is disposed proximate the second portion for sensing magnetic flux in the flux collector, such that the magnetic flux is used to determine a rotated position of the rotor.

20 Claims, 13 Drawing Sheets

Related U.S. Application Data

(60) Provisional application No. 61/987,279, filed on May 1, 2014.

(51) Int. Cl.

| | | |
|---|---|---|
| *F04C 13/00* | (2006.01) | |
| *F04C 15/00* | (2006.01) | |
| *H02K 5/132* | (2006.01) | |
| *H02K 11/33* | (2016.01) | |
| *H02K 5/22* | (2006.01) | |
| *H02K 7/14* | (2006.01) | |
| *F04B 23/02* | (2006.01) | |
| *F04C 15/06* | (2006.01) | |

(52) U.S. Cl.
CPC .......... *F04C 13/008* (2013.01); *F04C 15/008* (2013.01); *F04C 15/0096* (2013.01); *F04C 15/06* (2013.01); *H02K 5/132* (2013.01); *H02K 5/225* (2013.01); *H02K 7/14* (2013.01); *H02K 11/33* (2016.01); *F04C 2240/30* (2013.01); *F04C 2240/40* (2013.01); *F04C 2240/808* (2013.01); *F04C 2240/81* (2013.01)

(58) Field of Classification Search
CPC ............ F04C 2240/40; F04C 2240/808; F04C 2240/81; F04C 14/10; F04C 14/12; F04C 14/24; F04C 15/06; F04C 15/064; F04C 15/066; F04C 15/068; H02K 5/132; H02K 5/225; H02K 7/14; H02K 11/33
See application file for complete search history.

(56) References Cited

U.S. PATENT DOCUMENTS

| | | | |
|---|---|---|---|
| 3,272,129 A | 9/1966 | Leopold | |
| 3,347,168 A | 10/1967 | Nixon | |
| 3,411,704 A * | 11/1968 | Hilgert | G05D 7/0641 417/280 |
| 3,973,871 A | 8/1976 | Hance | |
| 4,105,372 A | 8/1978 | Mishina et al. | |
| 4,164,852 A | 8/1979 | Anzalone | |
| 4,229,142 A | 10/1980 | Le Dall et al. | |
| 4,636,149 A * | 1/1987 | Brown | F04B 43/04 417/322 |
| 4,644,207 A | 2/1987 | Catterfeld et al. | |
| 4,738,584 A | 4/1988 | Price | |
| 4,971,535 A | 11/1990 | Okada et al. | |
| 5,139,397 A | 8/1992 | Strelow | |
| 5,178,520 A | 1/1993 | Strelow | |
| 5,197,865 A | 3/1993 | Sevrain et al. | |
| 5,548,481 A * | 8/1996 | Salisbury | B60R 16/0238 174/16.3 |
| 5,785,013 A | 7/1998 | Sinn et al. | |
| 5,957,666 A | 9/1999 | Lee | |
| 6,193,473 B1 | 2/2001 | Mruk et al. | |
| 6,220,832 B1 | 4/2001 | Schöb | |
| 6,316,858 B1 | 11/2001 | Phillips | |
| 6,422,838 B1 | 7/2002 | Sloteman | |
| 6,425,244 B1 | 7/2002 | Ohashi et al. | |
| 6,663,362 B1 | 12/2003 | Lentz et al. | |
| 6,672,846 B2 | 1/2004 | Rajendran et al. | |
| 6,682,312 B1 | 1/2004 | Ward | |
| 6,710,492 B2 | 3/2004 | Minagawa | |
| 6,736,605 B2 | 5/2004 | Ohashi et al. | |
| 6,768,237 B1 | 7/2004 | Schroedl | |
| 6,860,349 B2 | 3/2005 | Ogawa et al. | |
| 7,156,623 B2 * | 1/2007 | Sakakibara | F04C 11/008 417/310 |
| 7,278,833 B2 | 10/2007 | Higashiyama et al. | |
| 7,682,136 B2 | 3/2010 | Donoho, II et al. | |
| 7,704,054 B2 | 4/2010 | Horvath et al. | |
| 7,806,667 B1 | 10/2010 | Hauser et al. | |
| 7,927,079 B2 * | 4/2011 | Suzuki | F04C 2/102 318/400.11 |
| 7,942,649 B2 | 5/2011 | Lesther et al. | |
| 8,038,423 B2 * | 10/2011 | Nakayoshi | F04C 2/086 310/261.1 |
| 8,210,829 B2 | 7/2012 | Horvath et al. | |
| 8,368,283 B2 | 2/2013 | Kim et al. | |
| 9,470,219 B2 * | 10/2016 | Kato | F04D 13/06 |
| 2005/0103286 A1 | 5/2005 | Ji | |
| 2007/0065314 A1 | 3/2007 | Nagata et al. | |
| 2010/0139582 A1 | 6/2010 | Bilezikjian et al. | |
| 2010/0158703 A1 | 6/2010 | Hattori et al. | |
| 2010/0168848 A1 | 7/2010 | Horvath et al. | |
| 2010/0262301 A1 | 10/2010 | Schwartz et al. | |
| 2011/0048390 A1 | 3/2011 | Washburn | |
| 2011/0052433 A1 | 3/2011 | Huang | |
| 2011/0116954 A1 | 5/2011 | Hong et al. | |
| 2011/0120394 A1 | 5/2011 | Onozawa et al. | |
| 2011/0123370 A1 | 5/2011 | Kim et al. | |
| 2011/0142690 A1 | 6/2011 | Shimizu et al. | |
| 2011/0265742 A1 | 11/2011 | Choi et al. | |
| 2013/0052058 A1 * | 2/2013 | Motohashi | F01C 21/02 417/410.4 |
| 2013/0093276 A1 | 4/2013 | Kim | |
| 2013/0294928 A1 | 11/2013 | Rosinski et al. | |
| 2014/0054991 A1 * | 2/2014 | Hyodo | F04C 15/008 310/71 |
| 2014/0271123 A1 | 9/2014 | Rosinski | |
| 2015/0083649 A1 | 3/2015 | Rosinski | |
| 2017/0016442 A1 * | 1/2017 | Hazama | F04C 2/102 |

FOREIGN PATENT DOCUMENTS

| | | |
|---|---|---|
| RU | 2160389 C1 | 12/2000 |
| SU | 1380617 A3 | 3/1988 |
| WO | 9118206 A1 | 11/1991 |
| WO | 0159288 A2 | 8/2001 |
| WO | 2004098677 A1 | 11/2004 |

OTHER PUBLICATIONS

International Search Report and Written Opinion of the International Searching Authority dated Apr. 24, 2014 (International Application No. PCT/US2014/015908).

International Search Report and Written Opinion of the International Searching Authority dated Jan. 22, 2015 (International Application No. PCT/US2014/056567).

\* cited by examiner

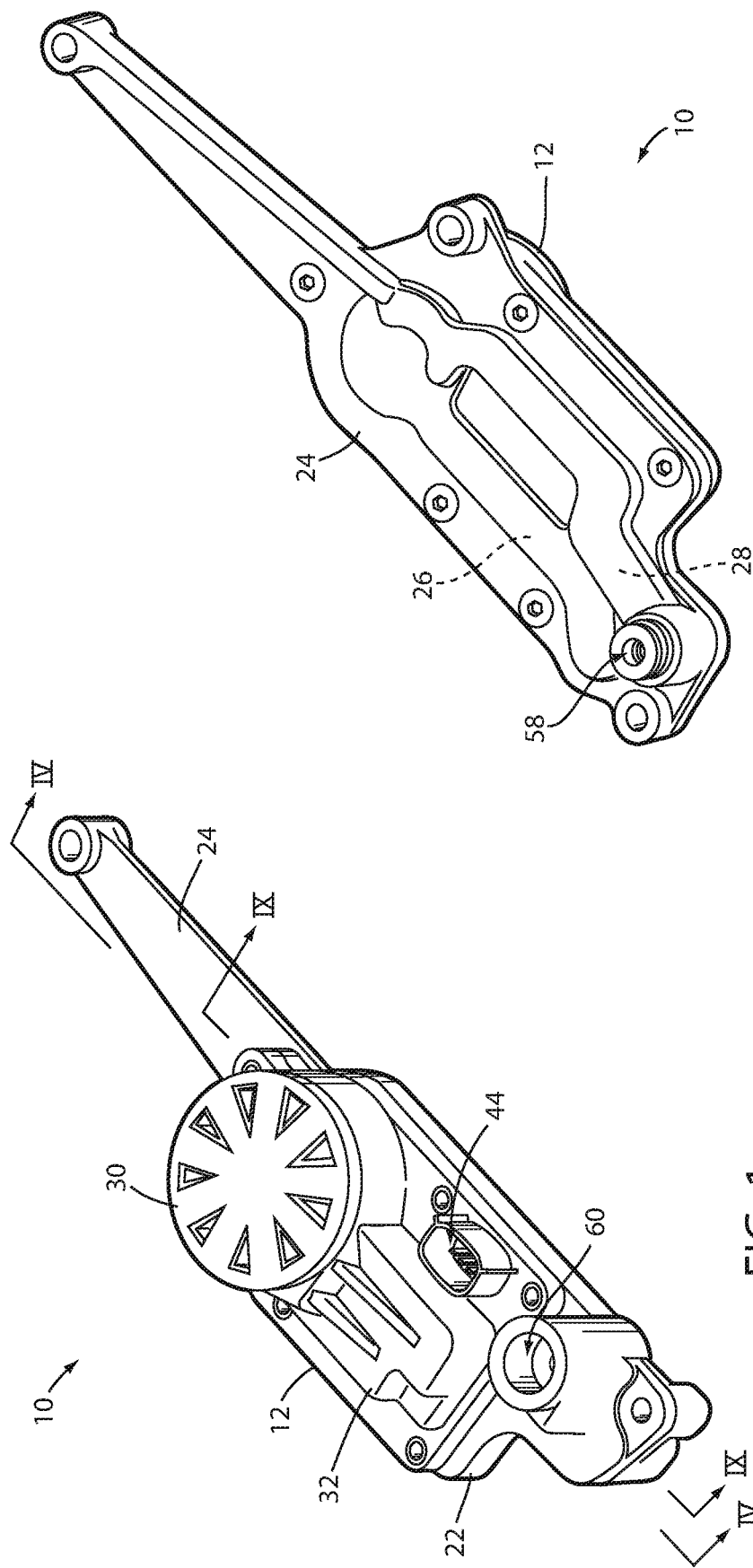

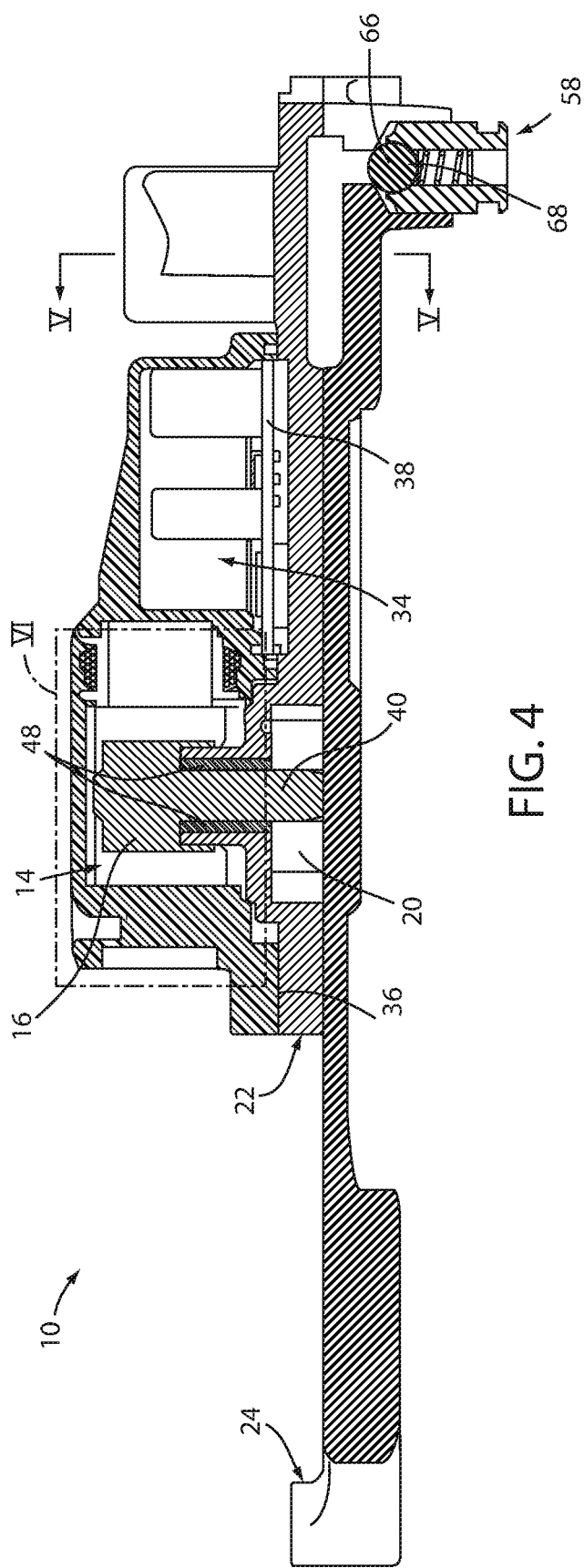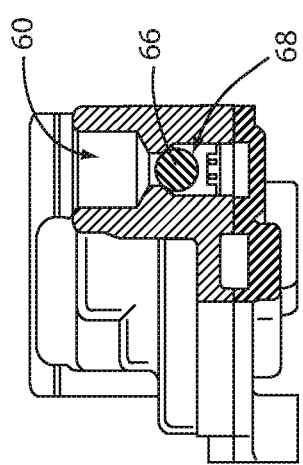
FIG. 4
FIG. 5

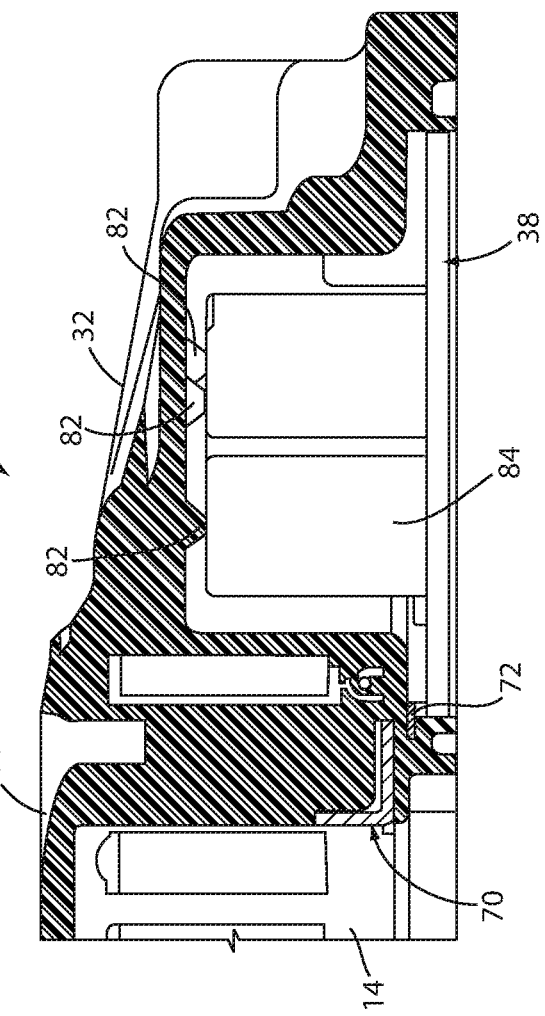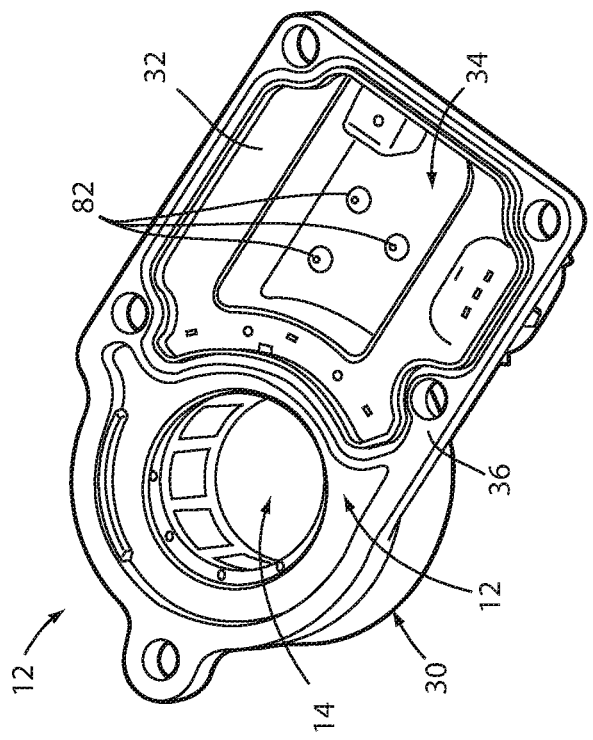
FIG. 11
FIG. 12

SUBMERSIBLE PUMP ASSEMBLY

CROSS-REFERENCE TO RELATED APPLICATIONS

This is a continuation-in-part application claiming benefit of application Ser. No. 14/696,811, filed Apr. 27, 2015, entitled SUBMERSIBLE TRANSMISSION FLUID PUMP ASSEMBLY, and also claims benefit under 35 USC section 119(e) to U.S. of Provisional Application No. 61/987,279, filed on May 1, 2014, entitled SUBMERSIBLE TRANSMISSION FLUID PUMP ASSEMBLY, the disclosure of both of which is hereby incorporated herein by reference in its entirety.

FIELD OF THE INVENTION

The present invention generally relates to pump assemblies that may be submersed in fluid, and more particularly relates to a transmission fluid pump assembly that may be packaged in several different transmission variants, such as transmissions for different vehicles and engine configurations.

BACKGROUND

Many factors drive vehicle design, including increasing gas mileage standards and a desire to maintain or increase performance capability. As engine space for vehicles becomes more constricted, many changes are presented to improve engine performance while adhering to the space constraints in vehicles. More specifically, each vehicle model tends to have individually unique constraints on size, shape, control, and performance characteristics of its pump assembly. This can result large numbers of different/unique parts, large in-process inventories, and concurrently in relatively low volume runs of many parts. This in turn results in higher costs per part, higher costs per assembly, and dramatically increased complexity of assembly.

A pump assembly is desired that is capable of meeting performance and special requirements set by vehicle manufacturers, while also minimizing part numbers, while maximizing use of common parts on "related but different" pump assemblies, yet that maintains flexibility of design.

SUMMARY OF THE PRESENT INVENTION

According to one aspect of the present invention, a pump assembly for mounting within a fluid reservoir and transferring fluid includes a stator housing defining a rotor cavity. A rotor is rotatably coupled within the rotor cavity. A positive displacement pump is operably coupled with the rotor for transferring the fluid. The positive displacement pump has an intake opening and an exhaust opening. A pump body has an inlet fluidly coupled with the intake opening and an outlet fluidly coupled with the exhaust opening. The pump body includes a channel between at least one of the inlet and intake opening and the outlet and exhaust opening. A printed circuit board (PCB) is configured to operably rotate the rotor. The PCB is coupled with the pump body proximate the channel, such that heat is transferred from the PCB to the fluid in the channel.

According to yet another aspect of the present invention, an electric motor for a pump assembly mounted within a fluid reservoir for transferring fluid includes a housing having a first cavity and a second cavity. A rotor is coupled within the first cavity, and the first cavity defines a stator. A printed circuit board (PCB) is disposed within the second cavity and is operably coupled with the stator, such that the PCB is configured to operate axial rotation of the rotor within the first cavity. The second cavity includes at least one retention feature integrally formed in housing for securely retaining the PCB to the housing.

According to yet another aspect of the present invention, a pump assembly for mounting within a fluid reservoir and transferring fluid, includes a stator housing having a rotor cavity. A rotor is rotatably coupled within the rotor cavity. A positive displacement pump is operably coupled with the rotor for transferring the fluid. A pump body has a pump cavity securing the positive displacement pump, whereby a first side of the pump body is fixed to the stator housing to define an interchangeable unit. A pump cover is coupled with a second side of the pump body. The pump cover has a set of mounting apertures for attaching to the transmission fluid reservoir. The interchangeable unit is configured to couple with a plurality of alternative pump covers with different sets of mounting apertures adapted for different transmissions.

According to yet another aspect of the present invention, a pump assembly for mounting within a fluid reservoir and transferring fluid includes a stator housing that has a rotor cavity for rotatably engaging a rotor. A pump body has a positive displacement pump for operably coupling with the rotor and transferring the fluid. The pump body has a first side coupled with the stator housing to define an interchangeable unit. A pump cover is coupled with a second side of the pump body and has a set of mounting apertures for attaching to the fluid reservoir. The interchangeable unit is configured to couple with a plurality of alternative pump covers with different sets of mounting apertures adapted for different reservoirs.

According to another aspect of the present invention, a pump assembly for mounting within a fluid reservoir and transferring fluid includes a stator housing having a rotor cavity for rotatably engaging a rotor. A pump body has a positive displacement pump for operably coupling with the rotor and transferring the fluid. The pump body has a first side coupled with the stator housing. A pump cover is coupled with a second side of the pump body, together defining an inlet channel and an outlet channel that respectively interconnect with an intake aperture and an exhaust aperture of the positive displacement pump.

According to another aspect of the present invention, a method is provided for forming a pump assembly for mounting within a fluid reservoir and for transferring fluid. The method includes providing a stator housing having a rotor cavity for rotatably engaging a rotor; providing a pump body having a positive displacement pump for operably coupling with the rotor and transferring the fluid, the pump body having a first side coupled with the stator housing; providing first and second pump covers, each shaped to be coupled with a second side of the pump body to define an inlet channel and an outlet channel that respectively interconnect with an intake aperture and an exhaust aperture of the positive displacement pump, the first and second pump covers defining different attachment patterns for mounting the pump assembly; and selecting and attaching one of the first and second pump covers to the pump body to form a unique pump assembly configured for mounting on a selected one of two different vehicles, where the two different vehicles have different pump attachment locations and different spacial constraints.

An object of the present invention is to provide pump assemblies capable of meeting individually unique constraints on size, shape, control, and performance characteristics, yet doing so without the need for large numbers of different/unique parts, without the need for large in-process inventories, and concurrently while reducing the need for relatively low volume runs of many parts.

An object of the present invention is to provide a pump assembly capable of meeting performance and special requirements set by vehicle manufacturers, especially for handling automatic transmission fluid and while located in a reservoir of an automatic transmission, while also minimizing part numbers, while maximizing use of common parts on "related but different" pump assemblies, yet while maintaining flexibility of design.

These and other aspects, objects, and features of the present invention will be understood and appreciated by those skilled in the art upon studying the following specification, claims, and appended drawings.

BRIEF DESCRIPTION OF DRAWINGS

In the drawings:

FIG. 1 is a top perspective view of one embodiment of a pump assembly that may be mounted within a transmission fluid reservoir of a vehicle transmission;

FIG. 2 is a bottom perspective view of the pump assembly, according to the embodiment shown in FIG. 1;

FIG. 4 is a cross-sectional view of the pump assembly, taken at line IV-IV of FIG. 1;

FIG. 5 is cross-sectional view of an inlet valve of the pump assembly, taken at line A-A of FIG. 4;

FIG. 11 is a bottom perspective view of a stator housing of the electric motor, according to one embodiment;

FIG. 12 is a cross-sectional view of the stator housing, showing a printed circuit board retained in a cavity therein, according to one embodiment;

DETAILED DESCRIPTION OF PREFERRED EMBODIMENTS

Figure 3:
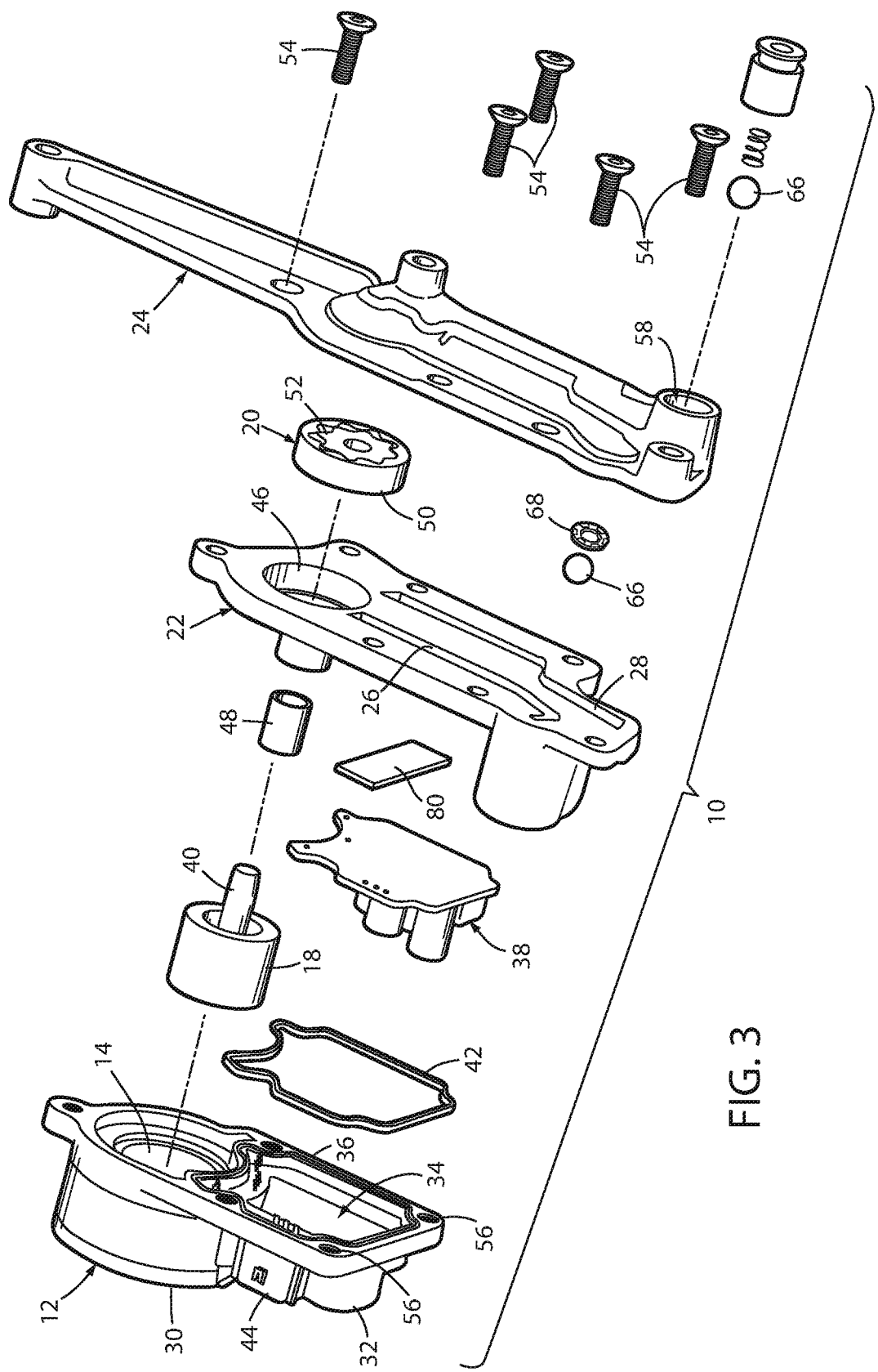
FIG. 3 is an exploded bottom perspective view of the embodiment of the pump assembly shown in FIG. 1.

For purposes of description herein, the terms "upper," "lower," "right," "left," "rear," "front," "vertical," "horizontal," and derivatives thereof shall relate to the pump assembly embodiment as oriented in FIG. 1. However, it is to be understood that the pump assembly may assume various alternative orientations, except where expressly specified to the contrary. It is also to be understood that the specific devices and processes illustrated in the attached drawings, and described in the following specification are simply exemplary embodiments of the inventive concepts. Hence, specific dimensions and other physical characteristics relating to the embodiments disclosed herein are not to be considered as limiting, unless expressly state otherwise.

Referring to the embodiments illustrated in FIGS. 1-16, reference numeral 10 is used to generally designate a pump assembly that is configured for transferring automatic transmission fluid (ATF) to associated engine components. The pump assembly 10, according to one embodiment, may be mounted within a transmission fluid pool, slightly above a pan that defines a bottom surface of the transmission fluid reservoir. Accordingly, the pump assembly 10 may be adapted to be submersible within the ATF within the transmission fluid reservoir, and in one embodiment may be exposed to fluid and air temperature ranges from −40° C. to 150° C. and similarly may be operable in fluid and air temperature ranges from 0° C. to 125° C. The pump assembly 10, accordingly to one embodiment, has an electric motor and associated circuitry to operate the motor and in turn operate a pumping component of the pump assembly 10 for transferring ATF. The electric motor may not be sealed from ATF and thereby configured to receive transmission fluid for liberating and cooling benefits. It is understood that additional embodiments of the pump assembly 10 may be alternatively mounted to a transmission, such as on an exterior surface thereof, and may be mounted on alternative engine components. Further, it is appreciated that additional embodiments of the pump assembly 10 may be used for transferring other fluids, such as engine coolant or other conceivable fluids.

Still referring to the embodiments shown in FIGS. 1-16, the pump assembly 10 may include a housing 12 that has a plurality of electromagnetic coils arranged to surround a cylindrical cavity 14 that defines a stator, whereby the cylindrical cavity 14 is adapted to receive ATF contained in the transmission fluid reservoir. A rotor 16 (also called "back iron") may be axially positioned within the cylindrical cavity 14 and have a plurality of magnets 18 arranged about a rotational axis thereof. A positive displacement pump 20 (also referred to as a "gerotor assembly") may be operably coupled with the rotor 16, such that the plurality of electromagnetic coils interacts with the plurality of magnets 18 to rotate the rotor 16 and thereby actuate the positive displacement pump 20. Also, a pump body 22 may be coupled between the stator housing 12 and a pump cover 24, whereby the pump body 22 includes an inlet channel 26 (a fluid channel, also called a "worm trail in pump body") and an outlet channel 28 (a fluid channel, also called a "worm trail in pump cover") from transferring ATF to and from the positive displacement pump 20.

As shown in one embodiment of the pump assembly 10 illustrated in FIGS. 1-3, the housing 12 (also referred to as a "stator housing" or "overmold assembly") includes the cylindrical cavity 14 (also referred to as a "rotor cavity") formed in a cylindrical portion 30 of the housing 12 adjacent to a generally rectangular portion 32, and has a PCB/circuitry cavity 34 formed adjacent to the cylindrical cavity 14 which similarly extends upward from a base surface 36 of the housing 12. The circuitry cavity 34 is adapted to enclose and fluidly seal a printed circuit board (PCB) 38, as described in more detail below. The cylindrical portion 30 of the housing 12 includes the plurality of electromagnetic coils, which may be substantially concealed in a sidewall of cylindrical portion 30 and arranged around the cylindrical cavity 14. The plurality of magnets 18 on the rotor 16 surround a central shaft 40 that defines the rotational axis thereof. More specifically, in one embodiment, each magnet is oriented in substantially parallel alignment with the central shaft 40 and the magnets 18 are equally spaced from the central shaft 40 to define a circular array of magnets 18, as shown in one embodiment illustrated in FIG. 7. The magnets 18 may be over-molded with a polymer material or other substantially non-magnetic material to improve rotation of the rotor 16 relative to the stator housing 12. The cylindrical cavity 14 may be partially or entirely filled with ATF, such that the rotor 16 is adapted to freely rotate and interact with the plurality of electromagnetic coils when partially or completely submerged in ATF. It is contemplated that the magnets 18 and electromagnetic coils may be reversed to similarly form an electric motor. Also, it is conceivable that the housing 12 may be divided, such that the cylindrical cavity 14 may be a separate piece from the portion of the housing 12 surrounding the circuitry cavity 34.

The pump body 22 illustrated in FIGS. 1-3 is attached to the base surface 36 of the housing 12 to substantially enclose the cylindrical cavity 14 and the circuitry cavity 34. A gasket 42 may be secured between the pump body 22 and the circuitry cavity 34, which borders a periphery of the circuitry cavity 34 to form a fluid seal around the circuitry cavity 34. As such, the fluid seal prevents ATF from entering the circuitry cavity 34. To electrically connect with the PCB 38 sealed within the circuitry cavity 34, a connector 44, such as a three pin connector, may be provided on an upper surface of the housing 12 proximate the rectangular portion 32. The connector 44 may be configured to receive power and to receive and send communication signals. It is understood that the connector 44 may include more or fewer metal contacts.

As further shown in FIGS. 1-3, the pump body 22 also has a pump cavity 46 that is configured to secure the positive displacement pump 20 in the pump body 22. As part of connecting the rotor 16 to the pump body 22, a plain bearing 48 may be provided between the central shaft 40 of the rotor 16 and a shaft opening on the pump body 22 that extends into the pump cavity 46. The positive displacement pump 20 in the illustrated embodiment is a gerotor pump with an outer portion 50 that rotates relative to the pump body 22 and an inner portion 52 that is coupled with the central shaft 40 of the rotor 16. It is contemplated that an alternative positive displacement pump, such as a rotary vane pump, or other types of pumps may be used in place of the gerotor to provide a pumping component in the pump assembly 10 for transferring the ATF.

Still referring to FIGS. 1-3, a pump cover 24 is attached to the pump body 22 on an opposite side from the housing 12. To effectuate the connection of the pump cover 24 and pump body 22 in the illustrated embodiment, a series of fasteners 54 extend through fastener apertures in the pump cover 24 and corresponding apertures in the pump body 22 to engage the threaded fastener holes 56 in the base surface 36 of the housing 12, such that heads of the fasteners 54 abut the pump cover 24 and hold the pump body 22 with compressive force between the housing 12 and the pump cover 24. These fasteners 54 are shown as elongated bolts, although it is understood that they may be replaced with other types of fasteners as generally understood in the art. The pump cover 24 encloses the pump cavity 46 and together with the pump body 22 provides inlet and outlet channels 26, 28 to distribute ATF to and from the positive displacement pump 20. Accordingly, the pump cover 24 includes an outlet valve 58 and the pump body 22 includes an inlet valve 60, whereby the outlet valve 58 is interconnected with the outlet channel 28 and the inlet valve 60 is interconnected with the inlet channel 26. The inlet channel 26 provides ATF from the inlet valve 60 to an intake aperture 62 (FIG. 13) on the positive displacement pump 20 and the outlet channel 28 transfers ATF from an exhaust aperture 64 (FIG. 13) on the positive displacement pump 20 to the outlet valve 58. It is contemplated that in alternative embodiments the pump body 22 or the pump cover 24 may entirely contain the inlet channel 26, the outlet channel 28, the inlet valve 60, and the outlet valve 58. It is also understood the inlet valve 60 may be reversed from the outlet valve 58, along with the corresponding inlet and outlet channels 26, 28, upon reversing rotation of the rotor 16.

As shown in FIGS. 4-5, the inlet and outlet valves 60, 58 are provided with a ball 66 that is biased against an opening to define check valves 68, whereby the ball 66 moves away from the opening to permit fluid flow. The outlet valve 58 in the illustrated embodiment includes a spring that biases the ball 66 against the opening. The illustrated embodiment of the inlet valve 60 includes a plastic catch to hold the ball 66 when it moves away from the opening, such that the ball 66 is biased against the opening by pressure within the inlet channel 26 being greater than outside the inlet valve 60, as generally understood in operation of such a transmission fluid pump assembly 10. The plastic catch prevents the ball 66 in the inlet valve 60 from traversing into the inlet channel 26 and accordingly is permeable to permit ATF to flow past the ball 66 and the plastic catch. It is conceivable that alternative check valve assemblies may be included in additional embodiments of the pump assembly 10 to provide substantially similar functionality.

Figure 6:
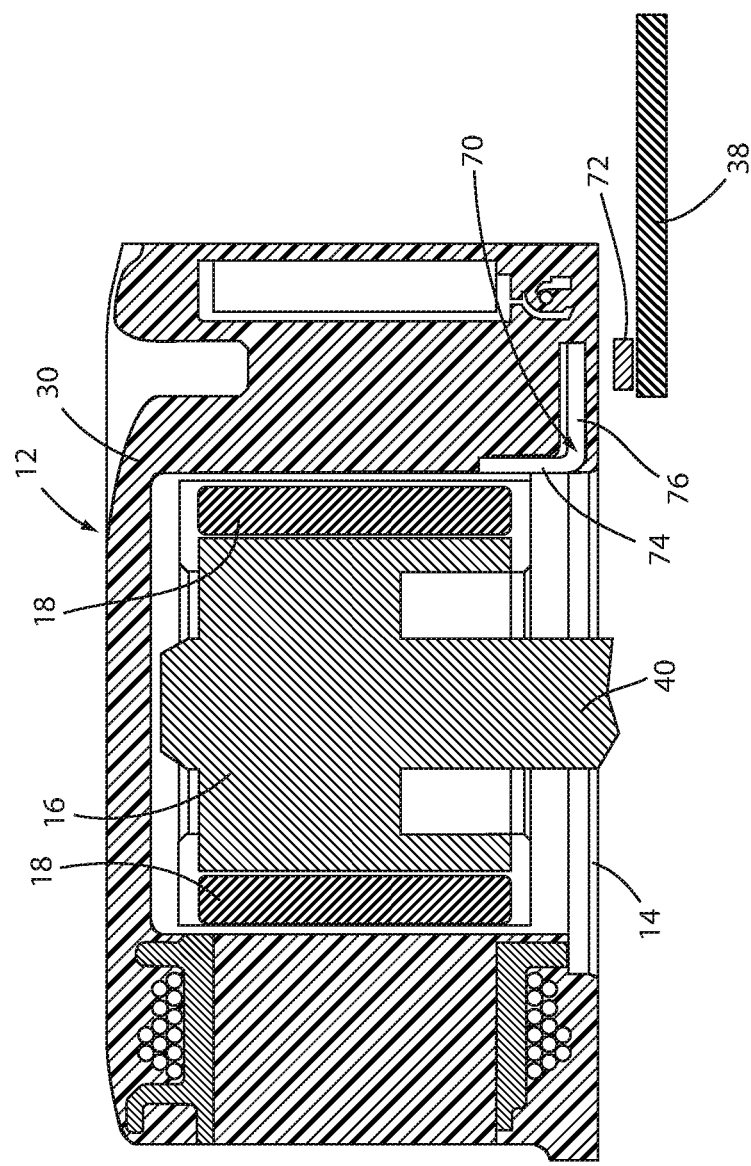
FIG. 6 is a cross-sectional view of an electric motor of the pump assembly, taken at section VI of FIG. 4.
Figure 8:
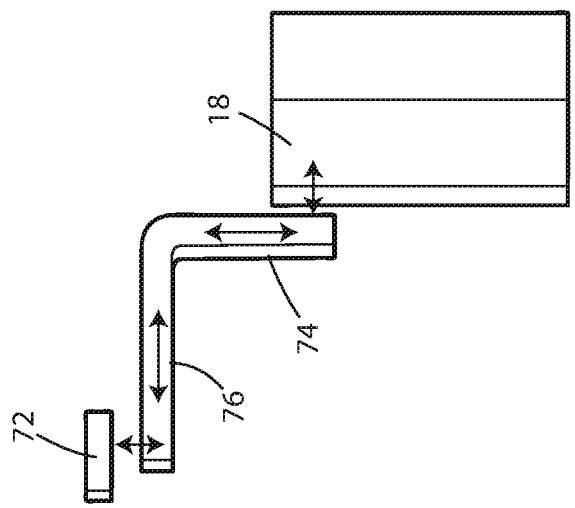
FIG. 8 is an enlarged side elevational view of the flux collector interfacing with a rotor magnet, showing transfer of magnetic flux from the rotor magnet to a hall sensor via the flux collector.
Figure 7:
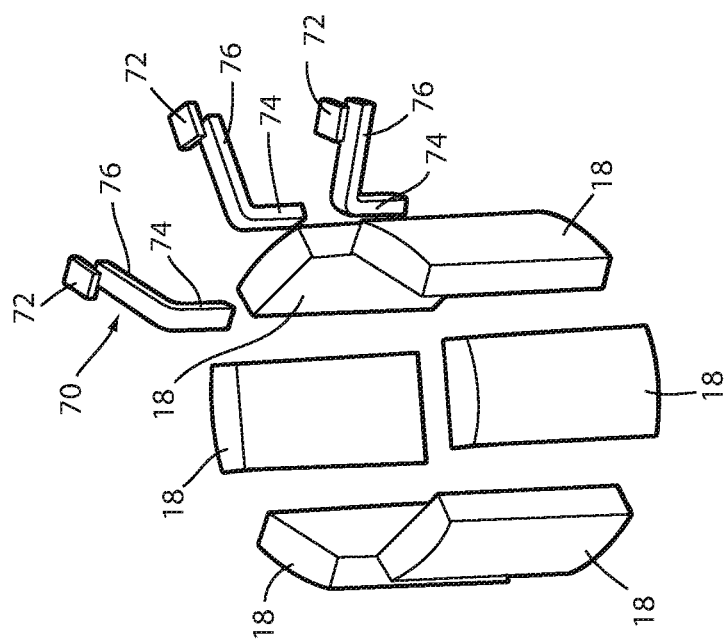
FIG. 7 is a bottom perspective view of rotor magnets and flux collectors of the electric motor shown in FIG. 6.

Referring now to the embodiment illustrated in FIGS. 6-8, a flux collector 70 is coupled with the stator housing 12 adjacent to the cylindrical cavity 14 for transferring magnetic flux from one of the plurality of magnets 18 on the rotor 16 to a hall sensor 72. Accordingly, the flux collector 70 may be a metal member or made of another conceivable material capable of acting as a conduit for magnetic flux. The flux collector 70, in the illustrated embodiment, includes a first portion 74 molded within a sidewall of the stator housing 12 adjacent to the cylindrical cavity 14 and a second portion 76 protruding away from the cylindrical cavity 14. The first portion 74 of the flux collector 70 is arranged in parallel orientation to the rotational axis of the rotor 16 and the second portion 76 extends radially from the first portion 74 away from the rotor 16 to define an L-shape, in the illustrated embodiment. As such, the first portion 74 is arranged near or in alignment with the interior diameter of the cylindrical cavity 14, such that the first portion 74 is in close proximity with the outer diameter of the rotor 16 defined by plurality of magnets 18. The close proximity of the first portion 74 allows the magnetic flux from one of the plurality of magnets 18 to transfer to first portion 74 of the flux collector 70 and thereby inherently transfer to the second portion 76 of the flux collector 70 away from the rotor 16. The flux collector 70 thereby allows the magnetic flux to be sensed at a spaced distance from the rotor 16 and cylindrical cavity 14, which may be filled with ATF As shown in FIGS. 6-8, the hall sensor 72 is disposed proximate the second portion 76 for sensing magnetic flux in the flux collector 70, which is provided by at least one of the plurality of magnets 18. The change in the magnetic flux that is sensed by the hall sensor 72 is used to determine a rotated position of the rotor 16. The hall sensor 72 in the illustrated embodiment is coupled with the PCB 38 that is contained in the circuitry cavity 34 of the housing 12. Accordingly, the hall sensor 72 may be fluidly sealed from being exposed to ATF, as the PCB 38 along with the hall sensor 72 is fluidly sealed within the circuitry cavity 34. In the embodiment shown in FIG. 7, three flux collectors 70 are spaced on a circumference of the cylindrical cavity 14, with each flux collector 70 including a dedicated hall sensor 72. It is also contemplated that more or fewer flux collectors 70 may be provided, such as two flux collectors 70 or a flux collector 70 for each magnet on the rotor 16. The flux collectors 70 shown in the embodiment of FIG. 7 are spaced along the circumference at a radial spacing less than the radial spacing of the plurality of magnets 18 around the rotational axis of the rotor 16. However, in additional embodiments, the radial spacing of the flux collectors 70 may be greater than the radial spacing of the plurality of magnets 18 around the rotational axis of the rotor 16. The change in magnetic flux sensed by the hall sensors 72 in the illustrated embodiment may be defined by drops in magnetic flux experienced when rotor 16 rotates and the flux collector 70 is positioned between the magnets 18, such that a processor may determine the rotated position of the rotor 16 and the rotational speed of the rotor 16. It is also understood that the magnets 18 may be arranged or shaped to provide changes in magnetic flux across each magnet, such that the rotated position of the rotor 16 may be accurately determined.

The various components described above can be made in different ways and from different materials, as will be understood by persons skilled in this art. The illustrated back iron 16 and gerotor assembly are made from powder metal. The magnets 18 are made using Neodymium. The pump body 22 and pump cover 24 are made from plastic or aluminum. The overmold 30 is made from high temperature nylon. The shaft 40 is steel, basket 42 is rubber, and connector 44 is plastic. The bearing 48 is made of plastic, and gerotor 50 and 52 are powder metal.

Figure 9:
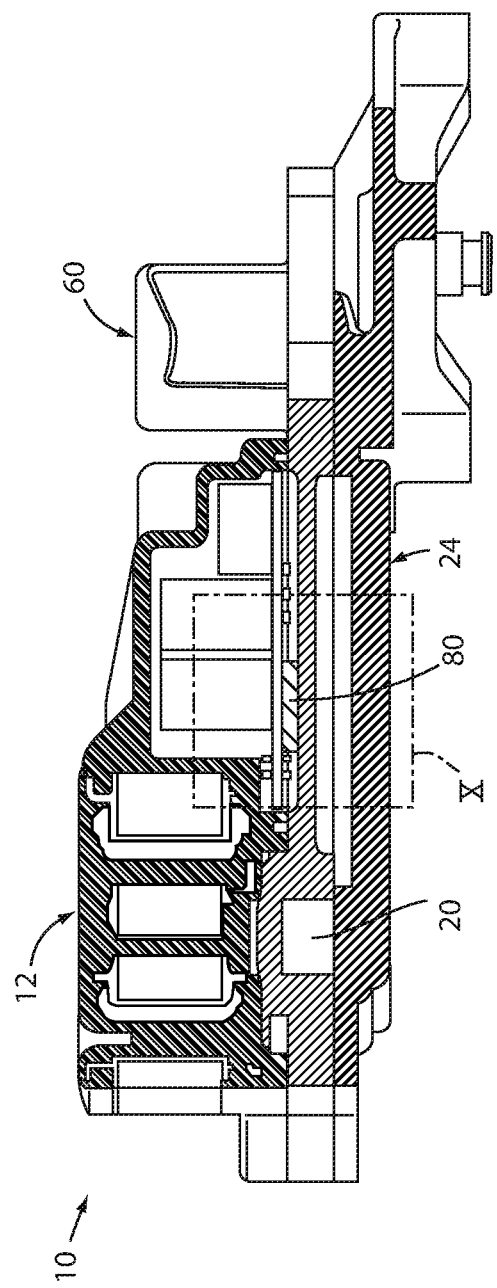
FIG. 9 is a perspective view of the pump assembly, taken at line IX-IX of FIG. 1.
Figure 10:
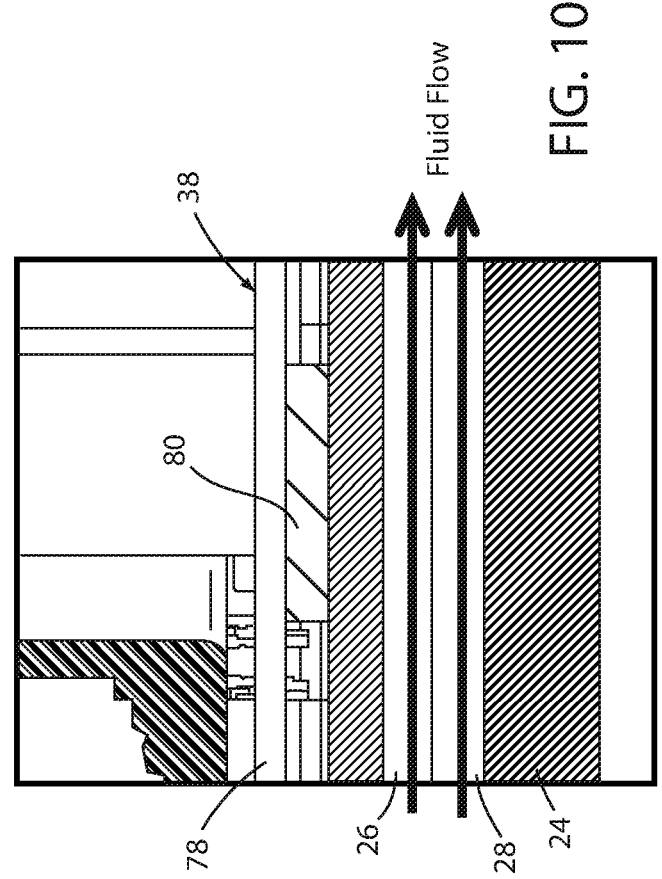
FIG. 10 is an enlarged sectional view, taken at section X of FIG. 9.

Referring now to the embodiment illustrated in FIGS. 9-10, the PCB 38 includes at least one transistor and at least one electrolytic capacitor, which along with other electrical components of the PCB 38 may generate heat that could affect operation of the PCB 38. Accordingly, in one embodiment, the PCB 38 may be coupled with the pump body 22 to transfer heat away from the PCB 38 to the pump body 22. More specifically, one embodiment of the pump body 22 includes an attachment location for the PCB 38 between the pump component and the inlet and outlet valves 60, 58, such that ATF is configured to circulate within the pump body 22 past the attachment location to absorb and transfer heat from the PCB 38. As shown in FIG. 3, the inlet and outlet channels 26, 28 may be formed in the pump body 22 to extend from the pump cavity 46 along a bottom surface of the pump body 22 to an end opposite from the pump cavity 46 that contains the inlet and outlet valves 60, 58. The PCB 38, as shown in FIGS. 9-10 may then thermally couple with a top surface of the pump body 22 proximate the channels 26, 28, such that heat is transferred from the PCB 38 to the ATF in the channels 26, 28. It is contemplated that the pump body 22 may include one or more ATF channels near the PCB 38 interface with the pump body 22.

As depicted in FIGS. 9-10, a thermal transfer material 80 may be included between a board 78 of the PCB 38 and the top surface of the pump body 22 for providing efficient distribution of heat from the PCB 38 to the pump body 22. The thermal transfer material may for example include a thermal pad 80 comprising a silicone material. Additionally or alternatively, the thermal transfer material may include thermally conductive film, thermally conductive adhesive, thermally conductive phase change material, or other conceivable material to improve thermal conductivity between the PCB 38 and the pump body 22. The board 78 of the PCB 38, according to one embodiment, may comprise FR4 material, fiberglass, silicon, polymer, PPA, PBT, or other conceivable materials as generally understood by one having ordinary skill in the art. Further, the pump body 22 between the PCB 38 and the inlet and outlet channels 26, 28, in the illustrated embodiment, may include aluminum or other metals or alloys that provide efficient thermal conductively, as well as meet other strength and weight specifications for operation of the pump assembly 10.

With further reference to the PCB 38, one embodiment of the circuitry cavity 34 in the housing 12 is illustrated in FIGS. 11-12. In the illustrated embodiment, the circuitry cavity 34 includes three retention features 82 integrally formed in the housing 12 for securely retaining the PCB 38 to the housing 12. The retention features 82 in the illustrated embodiment protrude down from an upper interior surface of the circuitry cavity 34 to contact a capacitor(s) 84 that protrudes upward from the board of the PCB 38, such that when the PCB 38 is attached to the housing 12, the retention features 82 bias the capacitor 84 and the PCB 38 downward to prevent upward movement or shifting during operation of the pump assembly 10 or movement of the surround environment, such as operation of the transmission or movement of a corresponding vehicle. It is appreciated that in additional embodiment the retention features 82 may protrude from other interior surfaces of the circuitry cavity 34 and that more of fewer retention features 82 may be included in the circuitry cavity 34 to bias, attach, or otherwise contact at least a portion of the PCB 38 to securely retain the PCB 38 to the housing 12. Accordingly, it is contemplated that the retention features 82 may include various shapes and arrangements. Also, it is conceivable that the retention features 82 may be the same material of the housing 12 or a different material, such as a metal member, an adhesive, a foam piece, or combinations thereof. The material making up the illustrated retaining features 82 is resilient such that upon assembly, it deforms as capacitors engage it. Further, its properties cause it to act as a damper to reduce the energy of shocks and harsh vibration against the capacitors during in-service use while on a vehicle.

Figure 13:
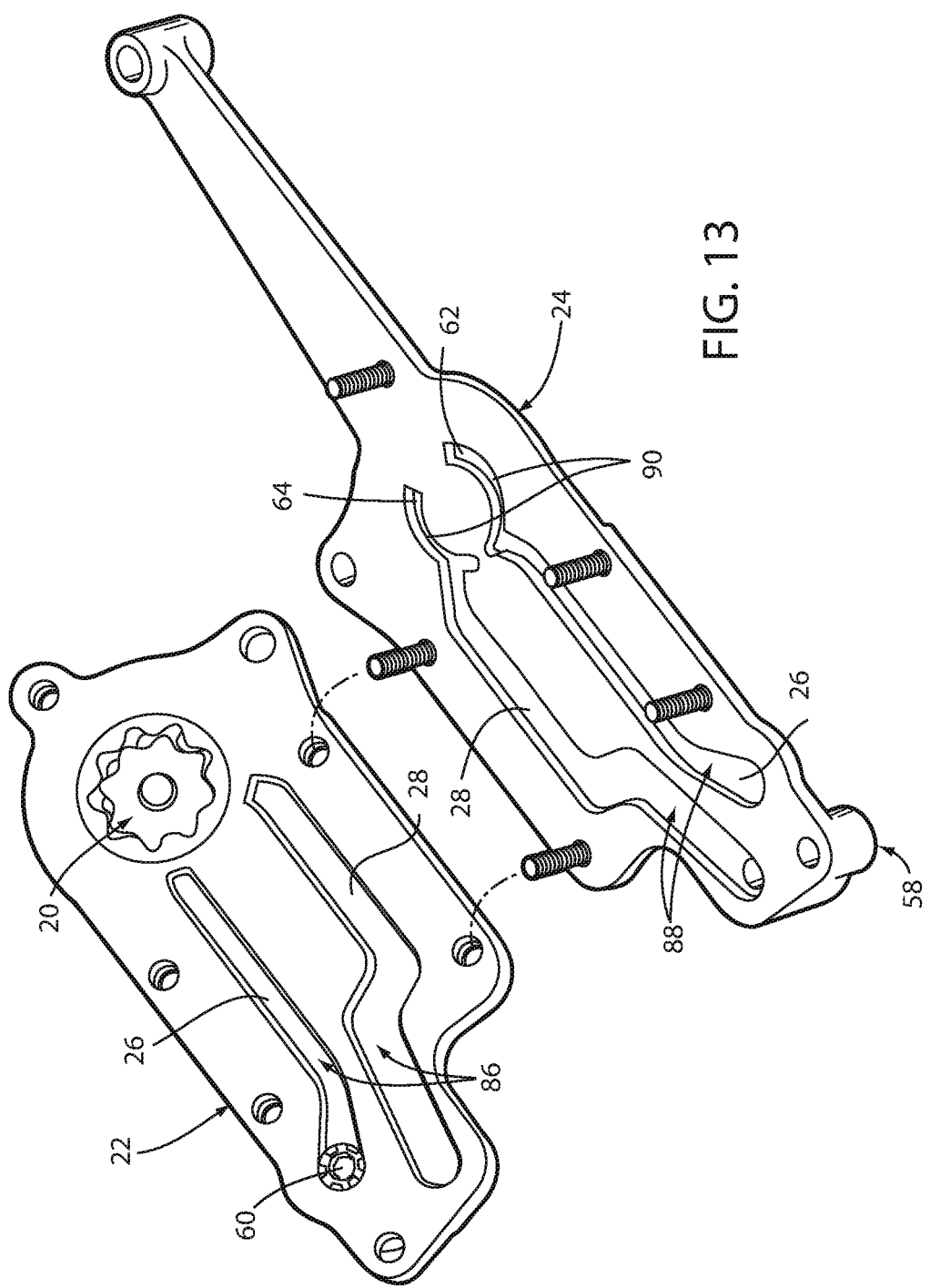
FIG. 13 is a perspective view of a pump cover disassembled from a pump body, according to one embodiment.

Referring again to the inlet and outlet channels 26, 28, as shown in the embodiment illustrated in FIG. 13, the channels are split along a length of the channels, defining a first section 86 of the inlet and outlet channels 26, 28 formed on a bottom side of the pump body 22 opposite the housing 12 and a second section 88 of the inlet and outlet channels formed on a mating surface of the pump cover 24. As such, attaching of the mating surface to the bottom side of the pump body 22 encloses the inlet and outlet channels 26, 28 and provides a fluid seal that prevents ATF from leaking for the respective channel. It is contemplated that first and second sections 86, 88 of the inlet and outlet channels 26, 28 may each be a half of the respective channel or may be an unbalanced proportion between the first and second sections 86, 88. In the illustrated embodiment, the second section 88 also includes curved cavities 90 that mate with the intake and exhaust apertures 62, 64 of the positive displacement pump 20, defined by radial sections of the gerotor.

Figure 15:
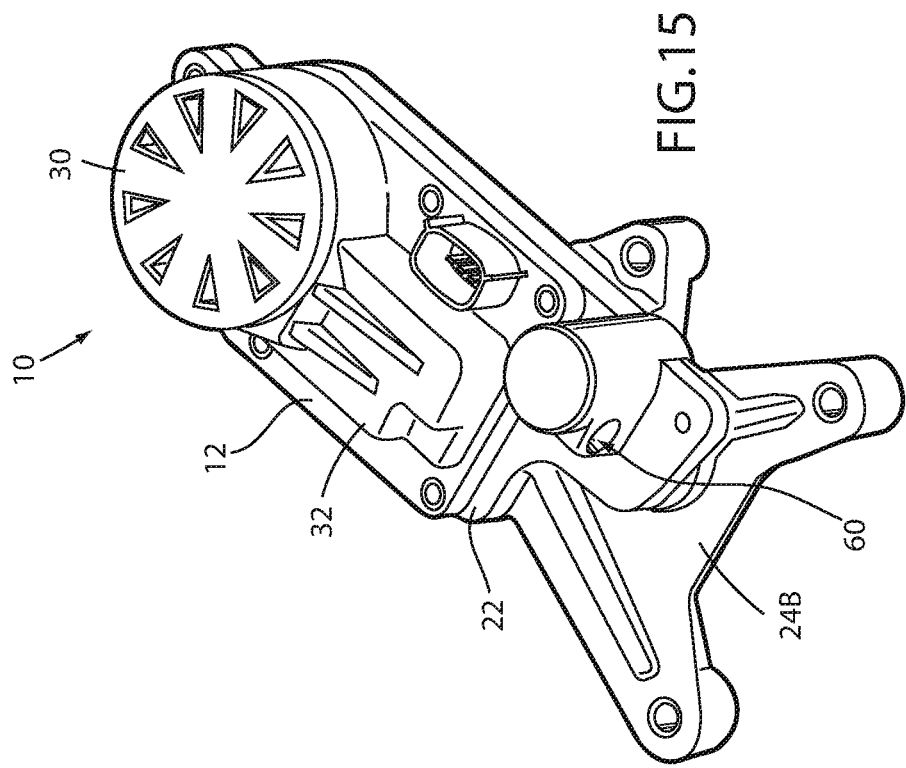
FIG. 15 is a top perspective view of an additional embodiment of a pump assembly that is customized for a different transmission.
Figure 14:
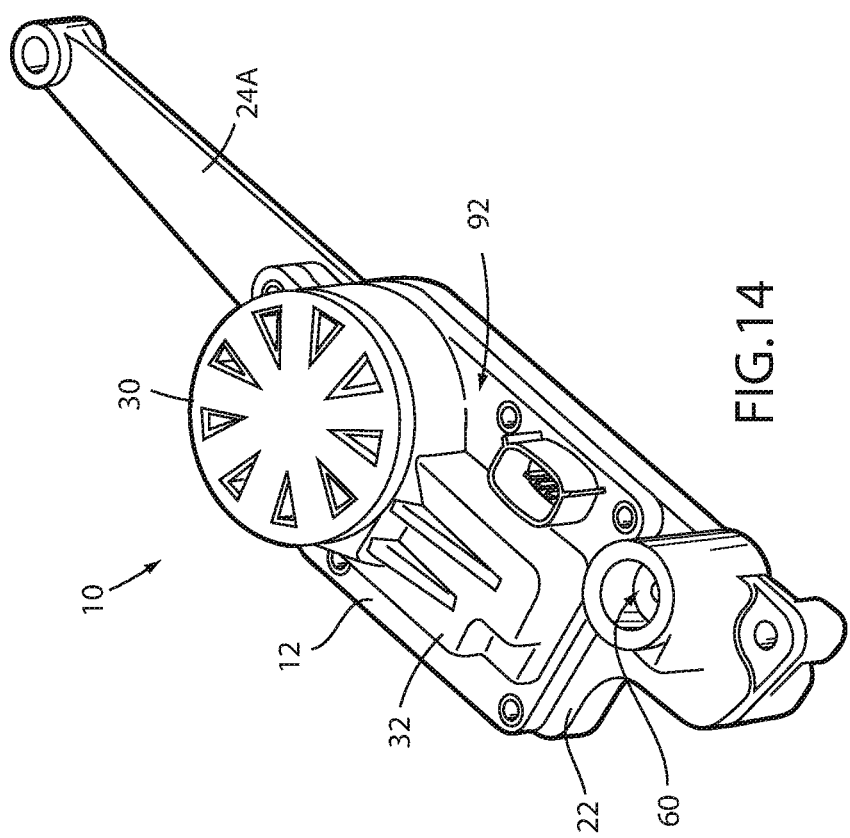
FIG. 14 is a top perspective view of a pump assembly, according to the embodiment shown in FIG. 1.
Figure 16:
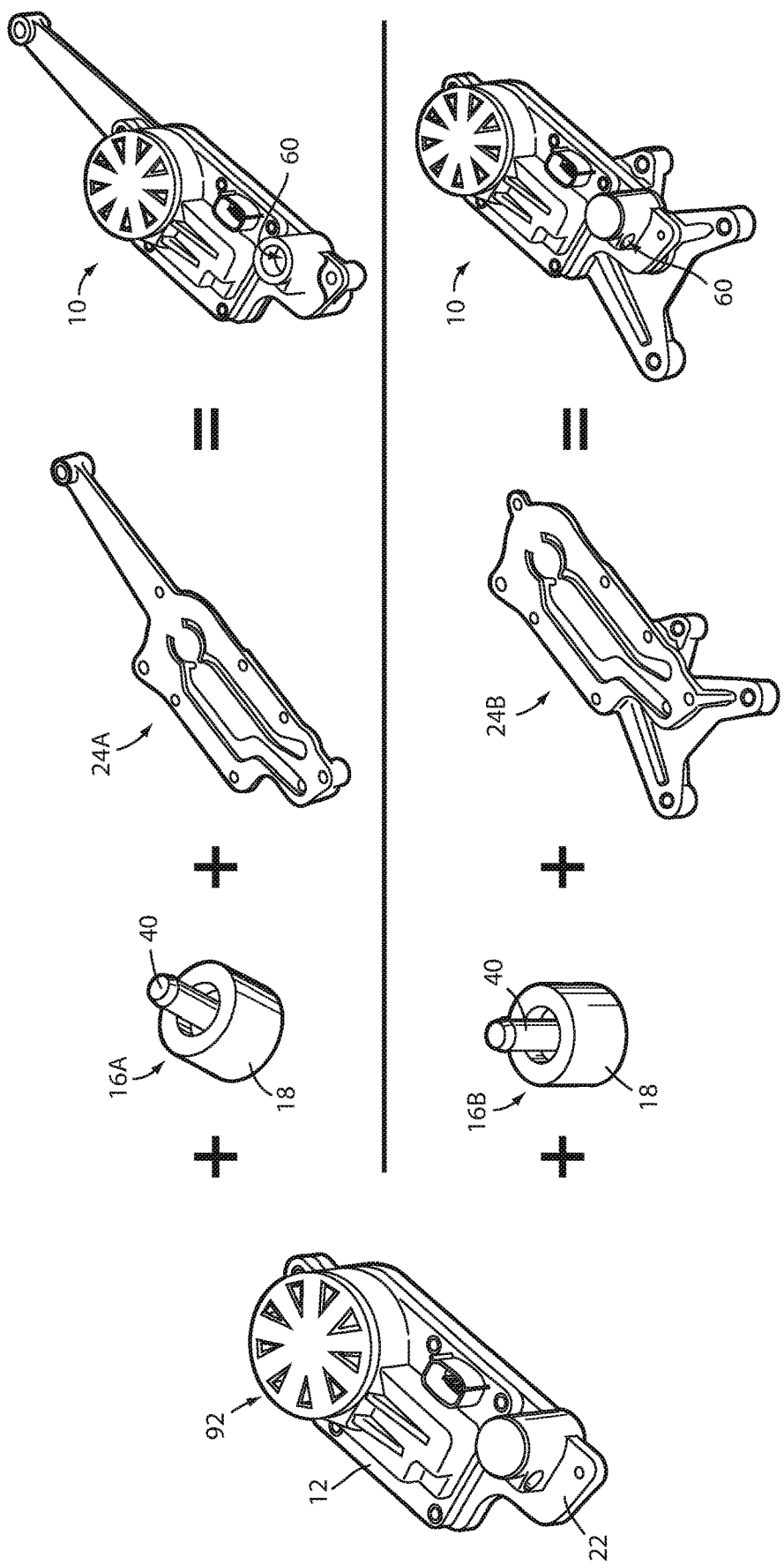
FIG. 16 is a flow diagram showing a method of customizing a pump assembly using an interchangeable unit to provide pump assemblies configured for different transmissions.

Referring now to FIGS. 14-16, two separate embodiments of a pump assembly 10 are illustrated to show how one embodiment of the pump body 22 and one embodiment of the stator housing 12 may be used to form an interchangeable unit 92 that is configured to couple with a variety of pump covers and used with a variety of rotors to provide different pump assemblies that are adapted for different transmissions. Further, a portion of the pump body 22 may be configured such that it may be machined, such as drilled, at alternative angles or locations to provide different inlet valves similarly adapted for different transmissions. With regard to the interchangeability of the pump cover 24, as illustrated in FIG. 16, a first embodiment of the pump cover 24A includes an elongated arm extending from a first end that has a mounting aperture formed at a distal end thereof and additional mounting apertures (i.e. a first attachment arrangement). A second embodiment of the pump cover 24B includes three fingers protruding form a second end opposite the first end, where each finger includes a mounting aperture at a distal end thereof (i.e. a second attachment arrangement, with at least one different mounting aperture). Accordingly, the illustrated embodiment of the interchangeable unit 92 may couple with alternative pump covers with different sets of mounting apertures adapted for attachment within differently configured transmission fluid reservoirs or more generally for attachment to differently configured engine components. It is also understood that an interchangeable unit 92 may couple with pump covers having other differentiating characteristics, such as differently configured outlet valves.

Further, as illustrated in FIG. 16, different embodiments of rotors 16 may be used with the illustrated embodiment of the interchangeable unit 92, such as a rotor 16A using NdFeB magnets (sintered neodymium-iron-boron magnets) as the part of or all of the plurality of magnets 18, a rotor 16B using bonded neo magnets, or a rotor 16 having more or fewer magnets 18 spaced around the rotational axis. It is also contemplated that several other differences in the various rotors that may be used with the interchangeable unit 92 to provide a customized pump assembly 10. With the interchangeable unit 92, it is possible to change only a few machining parameters, the design of the pump cover, and/or a rotor type to integrate the interchangeable unit 92 to meet a desired transmission specification or design. This allows not only for lower cost in producing the interchangeable unit 92 due to higher production volume, but also allows a more versatile product with more applications and therefore a higher market base.

Figure 17:
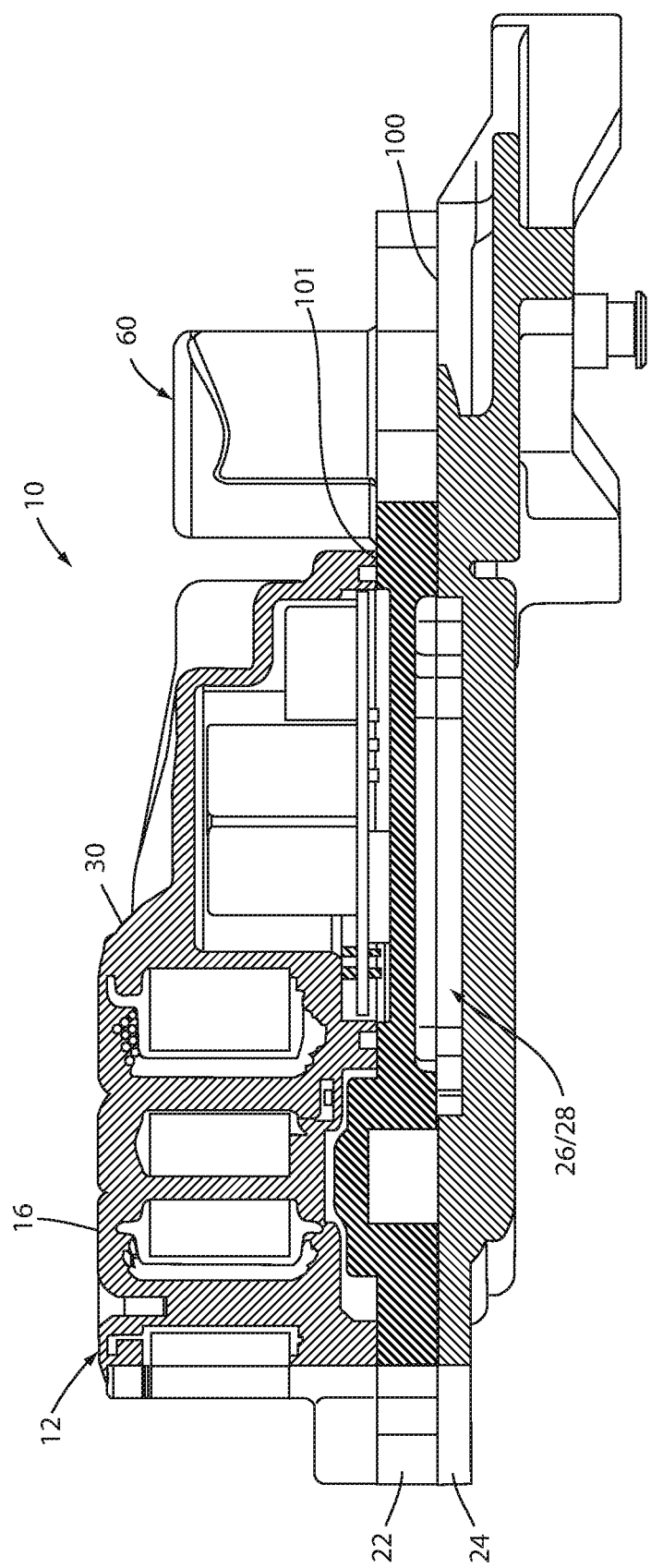
FIG. 17 is a cross section parallel to that of FIG. 4 (showing the pump of FIG. 1) but FIG. 17 shows more clearly shows half-channels and abutting surfaces of the pump body and pump cover of FIG. 17 which, when assembled, combine to form the two fluid channels (also called "split fluid channels" herein).
Figure 19:
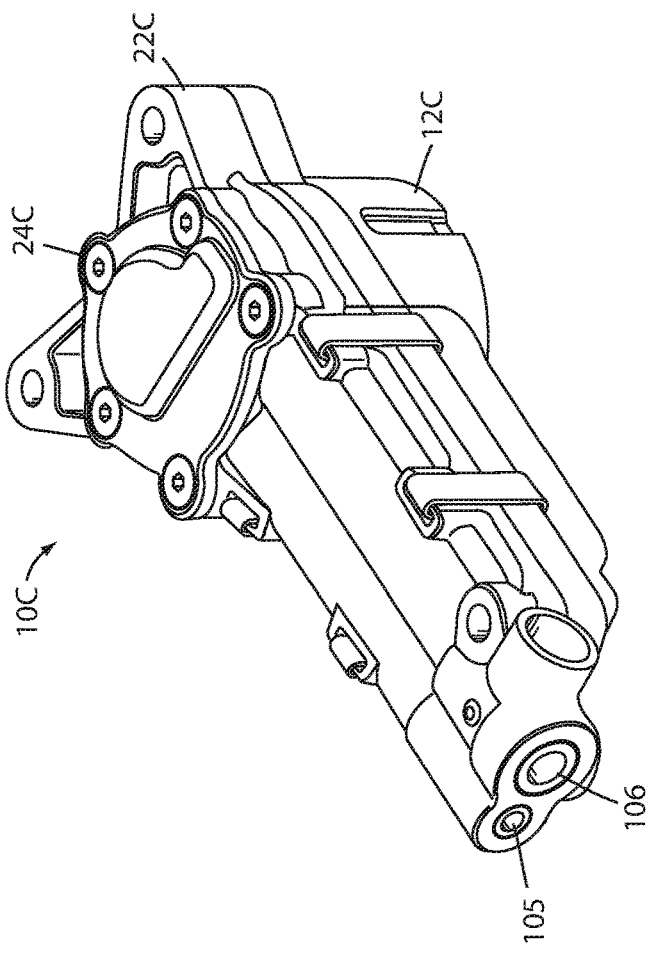
FIGS. 18-19 are top and bottom perspective views of a modified pump assembly similar to that in FIG. 17 and using similar identifying numbers, but that include a modified pump body and pump cover, the pump body including drilled fluid channels and passageway plugs (and thus not including split fluid channels), the drilled fluid channels allowing this modified pump assembly to withstand higher fluid pressures and also leading to lower manufacturing and assembly cost.
Figure 18:
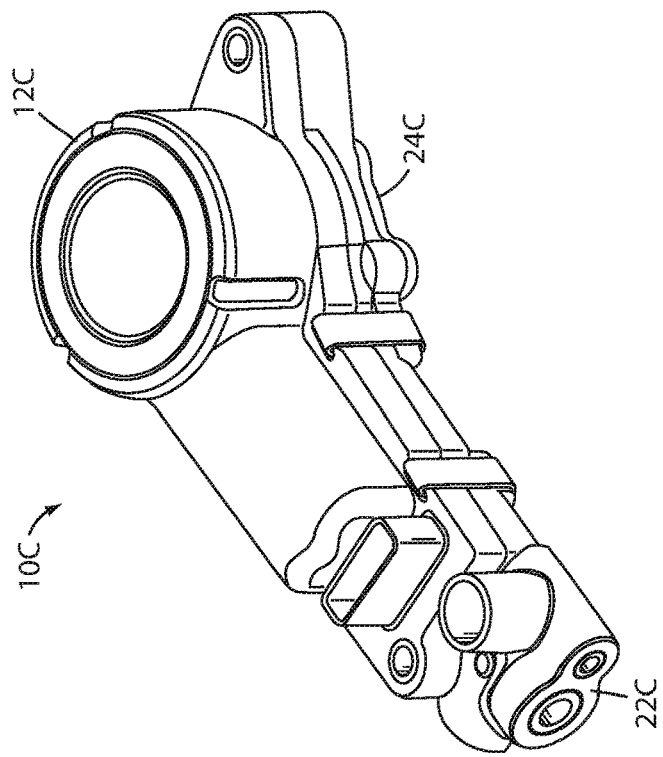
Figure 20:
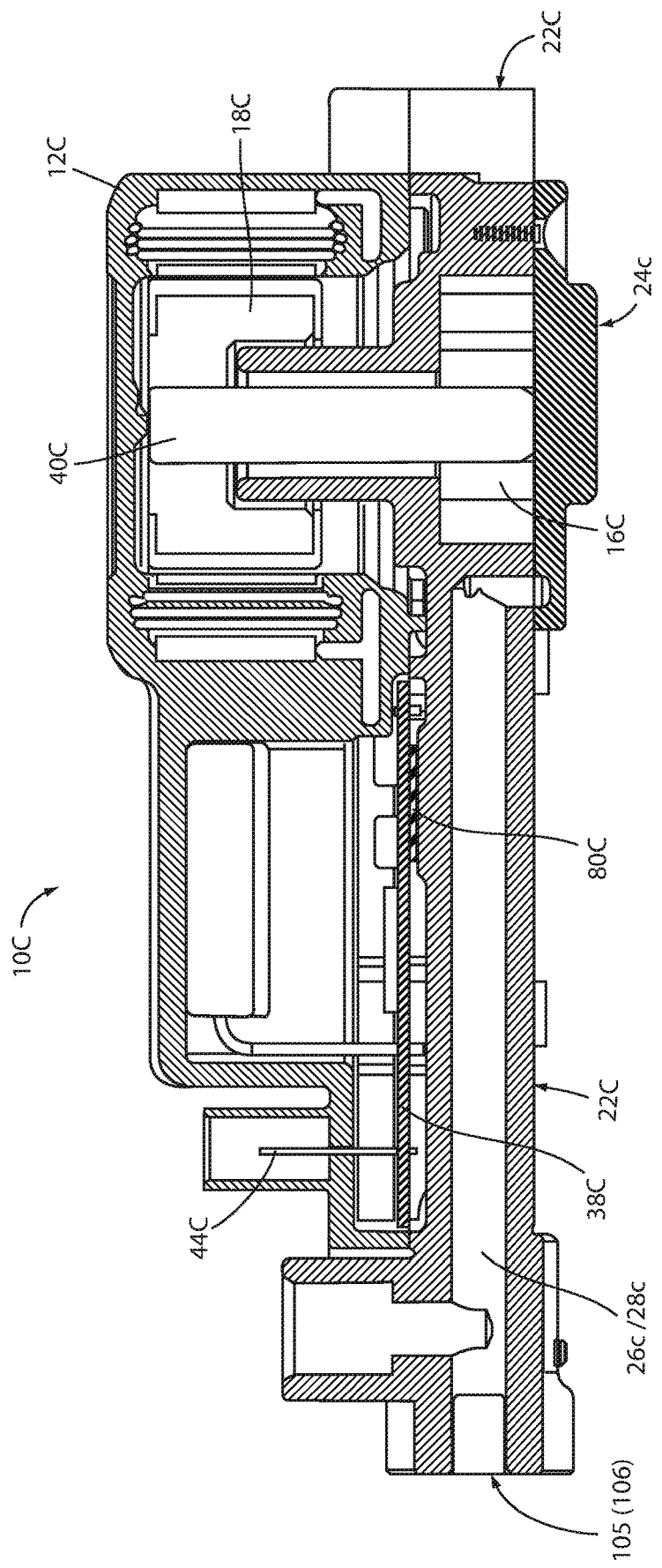
FIG. 20 is a cross sectioned side view of FIG. 18.

FIG. 17 is added to emphasize details of the pump assembly 10 shown in FIGS. 1 and 4, which includes a split-channel design. FIGS. 18-20 disclose details of a modified drilled-channel version of a pump assembly 10C that is not unlike pump assembly 10 but that has drilled channels. The drilled channels increase the fluid pressure that the pump assembly can handle and also reduce manufacturing and assembly cost. It is noted that FIG. 17 is a perspective view similar to FIG. 1 but clearly identifies the interface line 100 between an interface surface of the pump body 22 and a mating surface of the cylindrical portion 30 of the housing 12, and identifying a second as interface line 101 between the housing 12 and the pump cover 24. The "half channels" in components 22 and 12 combine to form split-channel in-flow and out-flow fluid channels 26 and 28, previously shown in the Figures, which lead fluid to and from the gyrator 20. Inlet and outlet check valves are included in channels 26 and 28 adjacent the inlet and outlet to the gyrator 20 for improved fluid control.

FIG. 17 is identical to the cross section of FIG. 4 (showing the pump of FIG. 1), but FIG. 17 clearly identifies abutting surfaces of the pump body 22 and pump cover 24, which when assembled, combine to form two fluid channels 26, 28 (called "split fluid channels" herein).

FIGS. 18-19 are top and bottom perspective views of a modified pump assembly 10C similar to the pump assembly 10 in FIG. 17. Components are identified using identical or similar numbers to identify identical and similar components and features. The modified pump body 22C includes sufficient thickness for drilled channels 26C and 28C (FIG. 20), and includes plugs 105 and 106 (FIG. 19) that close ends of the drilled channels, and includes a side access port adjacent plug 106 (FIG. 19). The pump body 22C also includes integral pump-forming features and motor-forming features not unlike that of pump body 22. The drilled fluid channels 26C, 28C (FIG. 20) allow this modified pump assembly 10C to withstand higher fluid pressures than the split channels 26, 28 in pump assembly 10 (especially where the same number of attachment screws are used). Advantageously, the pump body 22C with drilled channels also leads to lower manufacturing and assembly costs. FIG. 20 is a cross sectioned side view of FIG. 18.

Specifically, FIGS. 18-20 show the modified pump assembly 10C with further modified pump body 22C and pump cover 24C. The pump body 22C includes drilled fluid channels 24C, 26C and drilled-hole plugs 105, 106 that plug ends of the channels 26C, 28C. Lateral outlet openings are drilled in locations as desired (if desired) for side access to channels 26C, 28C. The modified pump assembly 10C does not include split fluid channels such that it can withstand higher fluid pressures without leakage. For example, the pump assembly 10C with drilled/plugged fluid channels can withstand a higher fluid pressure (e.g. greater than 3 bars, or in other words greater than 129 psi fluid pressure without additional closure fasteners along the channels) as compared to the pump assembly 10 with split fluid channels 26, 28 (which can handle less than about three bars with the illustrated fasteners along the split fluid channels 26, 28).

As will be understood by persons skilled in this art, the pump body 22C, pump cover 24C, and other components of modified pump assembly 10C are made with the same features and methods as those noted above in regard to the same components on pump assembly 10. Thus, a repetitious description is not necessary for skilled artisans.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A pump assembly for mounting within a fluid reservoir and transferring fluid, comprising:
    a stator housing having a rotor cavity for a rotor;
    a pump body having a positive displacement pump for operably coupling with the rotor and transferring the fluid, the pump body having a first side coupled with the stator housing; and
    a pump cover having a mating surface, wherein the mating surface is coupled with a second side of the pump body,
    wherein an inlet channel section and an outlet channel section are formed in both the pump body and the pump cover, such that when the mating surface is coupled with the second side of the pump body the inlet channel sections provide an inlet channel and the outlet channel sections provide an outlet channel, and the inlet channel and the outlet channel respectively interconnect with an intake aperture and an exhaust aperture of the positive displacement pump.

2. The pump assembly of claim 1, wherein the pump body includes an inlet valve that couples with the inlet channel, whereby an opening is formed into a portion of the pump body to define the inlet valve, such that the portion is configured to be machined in various configurations to define a plurality of potential inlet valves for different reservoirs.

3. The pump assembly of claim 1, wherein the pump cover includes an outlet valve that couples with the outlet channel, whereby an opening is formed into the pump cover to define the outlet valve, such that the pump cover is configured to be formed into various configurations to define a plurality of potential outlet valves.

4. The pump assembly of claim 1, wherein the rotor cavity is configured to couple with a plurality of alternative rotors adapted for different reservoirs.

5. A pump assembly for mounting within a fluid reservoir and transferring fluid, comprising:
    a stator housing having a rotor cavity for a rotor;
    a pump body having a positive displacement pump for operably coupling with the rotor and transferring the fluid, the pump body having a first side coupled with the stator housing; and
    a pump cover coupled with a second side of the pump body, together defining an inlet channel and an outlet channel that respectively interconnect with an intake aperture and an exhaust aperture of the positive displacement pump,
    wherein the pump body includes an inlet valve that couples with the inlet channel, whereby an opening is formed into the pump body to define the inlet valve, such that the pump body is configured to be formed into various configurations to define a plurality of potential inlet valves.

6. A pump assembly for mounting within a fluid reservoir and transferring fluid, comprising:
    a stator housing having a rotor cavity for a rotor;
    a pump body having a positive displacement pump for operably coupling with the rotor and transferring the fluid, the pump body having a first side coupled with the stator housing; and
    a pump cover coupled with a second side of the pump body, together defining an inlet channel and an outlet channel that respectively interconnect with an intake aperture and an exhaust aperture of the positive displacement pump,
    wherein a first section of the inlet and outlet channels are formed on the second side of the pump body and a second section of the inlet and outlet channel are formed on a mating surface of the pump cover, whereby attachment of the mating surface to the second side aligns the first and second sections to enclose the inlet and outlet channels.

7. The pump assembly of claim 6, wherein the first and second sections define longitudinal halves of the inlet and outlet channels.

8. A pump assembly for mounting within a fluid reservoir and transferring fluid, comprising:
    a stator housing having a rotor cavity;
    a rotor rotatably coupled within the rotor cavity;
    a positive displacement pump operably coupled with the rotor for transferring the fluid;
    a pump body having a pump cavity securing the positive displacement pump, wherein a first side of the pump body is fixed to the stator housing to define an interchangeable unit, wherein the pump body includes an inlet channel and an outlet channel that respectively interconnect with an intake aperture and an exhaust aperture of the positive displacement pump; and
    a pump cover coupled with a second side of the pump body, the pump cover having a set of mounting apertures for attaching to the fluid reservoir, wherein the interchangeable unit is configured to couple with a plurality of alternative pump covers with different sets of mounting apertures adapted for different reservoirs, wherein the pump body includes an inlet valve that couples with the inlet channel, whereby an opening is machined into a portion of the pump body to define the inlet valve, such that the portion is configured to be machined in various configurations to define a plurality of potential inlet valves.

9. The pump assembly of claim 8, wherein the pump cover includes an outlet valve that couples with the outlet channel, and wherein the plurality of alternative pump covers include different outlet valves.

10. The pump assembly of claim 8, wherein the rotor cavity is configured to couple with a plurality of alternative rotors adapted for different pump specifications.

11. A pump assembly for mounting within a fluid reservoir and transferring fluid, comprising:
- a stator housing defining a rotor cavity;
- a rotor rotatably coupled within the rotor cavity;
- a positive displacement pump operably coupled with the rotor for transferring the fluid, the positive displacement pump having an intake opening and an exhaust opening;
- a pump body having an inlet fluidly coupled with the intake opening and an outlet fluidly coupled with the exhaust opening, wherein the pump body has a first side facing the stator housing;
- a pump cover having a mating surface, wherein the mating surface is coupled with a second side of the pump body,
- wherein an inlet channel section and an outlet channel section are formed in both the pump body and the pump cover, such that when the mating surface is coupled with the second side of the pump body the inlet channel sections provide an inlet channel and the outlet channel sections provide an outlet channel, and
- a printed circuit board (PCB) configured to operably rotate the rotor, wherein the PCB is thermally coupled with a thermal material to the first side of the pump body proximate the inlet channel, such that heat is transferred from the PCB to the fluid in the inlet channel.

12. The pump assembly of claim 11, wherein the thermal material comprises a thermal transfer medium that includes a silicone material.

13. The pump assembly of claim 12, wherein the pump body comprises an aluminum alloy or a polymeric material, such that the thermal transfer medium is in direct contact between the pump body and the PCB.

14. The pump assembly of claim 11, wherein the inlet channel fluidly connects between the inlet and the intake opening and the outlet channel fluidly connects between the outlet and the exhaust opening, and wherein the PCB is thermally coupled with the inlet channel and the outlet channel.

15. The pump assembly of claim 11, wherein the PCB includes at least one transistor and at least one electrolytic capacitor.

16. A pump assembly for mounting within a fluid reservoir and transferring fluid, comprising:
- a stator housing defining a rotor cavity;
- a rotor rotatably coupled within the rotor cavity;
- a positive displacement pump operably coupled with the rotor for transferring the fluid, the positive displacement pump having an intake opening and an exhaust opening;
- a pump body having an inlet fluidly coupled with the intake opening and an outlet fluidly coupled with the exhaust opening, wherein the pump body includes a channel between at least one of the inlet and intake opening and the outlet and exhaust opening; and
- a printed circuit board (PCB) configured to operably rotate the rotor, wherein the PCB is coupled with the pump body proximate the channel, such that heat is transferred from the PCB to the fluid in the channel,
- wherein the stator housing is fixedly coupled with a plurality of electromagnetic coils arranged to surround the rotor cavity, which is cylindrical, the stator housing being adapted to receive the fluid;
- the rotor is axially positioned within the rotor cavity and has a plurality of magnets arranged about a rotational axis thereof, wherein the plurality of electromagnetic coils interact with the plurality of magnets to rotate the rotor for actuating the positive displacement pump; and
- a flux collector having a first portion disposed within a sidewall of the stator housing adjacent to the rotor cavity and a second portion protruding away from the rotor cavity.

17. The electric motor of claim 16, wherein the flux collector comprises a metal member that is molded into the stator housing and configured such that magnetic flux from the plurality of magnets transfers from the first portion to the second portion for interfacing with a sensor.

18. The electric motor of claim 17, wherein at least three flux collectors are spaced on a circumference of the cylindrical cavity, whereby each flux collector includes a dedicated sensor.

19. The electric motor of claim 16, wherein the first portion is substantially orthogonal to the second portion of the flux collector to define a substantially L-shape, whereby the first portion is arranged in parallel orientation to the rotational axis of the rotor and the second portion extends radially away from the rotor.

20. The electric motor of claim 16, including a hall sensor disposed proximate the second portion for sensing magnetic flux in the flux collector provided by at least one of the plurality of magnets, wherein changes in the magnetic flux is used to determine a rotated position of the rotor.

* * * * *